United States Patent
Evans (10) Patent No.: US 7,760,334 B1
(45) Date of Patent: Jul. 20, 2010

(54) OPTICAL MULTI-DISCRIMINANT LADAR

(75) Inventor: Bruno J. Evans, Keller, TX (US)

(73) Assignee: Lockheed Martin Corporation, Bethesda, MD (US)

(*) Notice: Subject to any disclaimer, the term of this patent is extended or adjusted under 35 U.S.C. 154(b) by 248 days.

(21) Appl. No.: 11/957,978

(22) Filed: Dec. 17, 2007

Related U.S. Application Data (60) Provisional application No. 60/891,816, filed on Feb. 27, 2007.

(51) Int. Cl.
*G01C 3/08* (2006.01)
(52) U.S. Cl. .................................. 356/4.01; 356/141.5
(58) Field of Classification Search ....... 356/4.01–5.15, 356/141.1, 141.5; 250/339.01, 339.05
See application file for complete search history.

(56) References Cited

U.S. PATENT DOCUMENTS

| | | | |
|---|---|---|---|
| 5,200,606 A | 4/1993 | Krasutsky et al. | 250/216 |
| 5,224,109 A | 6/1993 | Krasutsky | 372/29 |
| 5,285,461 A | 2/1994 | Krasutsky et al. | 372/29 |
| 5,345,304 A * | 9/1994 | Allen | 356/5.01 |
| 5,528,354 A * | 6/1996 | Uwira | 356/5.01 |
| 5,644,386 A | 7/1997 | Jenkins et al. | 356/4.01 |
| 5,682,225 A | 10/1997 | DuBois et al. | 356/73 |
| 5,852,492 A | 12/1998 | Nimblett et al. | 356/5.04 |
| 5,893,085 A | 4/1999 | Phillips et al. | 706/52 |
| 5,898,483 A | 4/1999 | Flowers | |
| 6,115,113 A | 9/2000 | Flockencier | 356/5.01 |
| 6,323,941 B1 | 11/2001 | Evans et al. | 356/4.01 |
| 6,362,872 B1 * | 3/2002 | Berdanier | 356/4.01 |
| 6,882,409 B1 | 4/2005 | Evans et al. | 356/4.02 |
| 2003/0137645 A1 | 7/2003 | Fluckiger | 356/4.01 |

OTHER PUBLICATIONS

Chun et al. "Polarimetric laser radar target classification", Optical Society of America, Optical Letters/ vol. 30, No. 14/ Jul. 15, 2005.*
U.S. Appl. No. 60/891,816, filed Feb. 27, 2007, Evans.
MNK-BAA-06-0001—Technical Concept White Paper: *Optical Multi-Discriminant Ladar*- May 2006 thru Apr. 2008; Bruno Evans and Eric Ericson.
Bruno J. Evans, unpublished Powerpoint Slide Set.
MNK-BAA-06-0001—Technical Proposal—"*Optical Multi-Discriminant Ladar Breadboard*" submitted by Lockheed Martin Missiles and Fire Control; Cost Quote: 06-5355 (May 19, 2006); Bruno Evans and Eric Ericson.
2004ASB051_PILAR—Polarimetric Imaging Laser Radar Program (Sep. 1, 2004) Bruno J. Evans, Richard D. Richmond.

* cited by examiner

*Primary Examiner*—Isam Alsomiri
(74) *Attorney, Agent, or Firm*—Williams, Morgan & Amerson, P.C.

(57) ABSTRACT

The present invention, in its various aspects and embodiments comprises a optical multi-discriminant ("OMD") LADAR technique. The technique includes a method, comprising: receiving a dichroic, polarimetric optical signal simultaneously with radiation of a third wavelength from a field of view through a common aperture; and capturing three-dimensional, polarimetric data from each wavelength of the optical signal and two-dimensional data from the radiation. The technique also includes an apparatus, comprising: means for receiving a reflection of a polarimetric, dichroic optical signal and a second signal of a third wavelength, separating the optical signal from the second signal by wavelength, separating the dichroic constituents of the optical signal by wavelength, and separating the polarized elements of the dichroic constituents; and a common aperture through which the optical signal is transmitted and the reflection and the second signal are received.

27 Claims, 6 Drawing Sheets

OPTICAL MULTI-DISCRIMINANT LADAR

BACKGROUND OF THE INVENTION

The earlier effective filing date of U.S. Provisional Application Ser. No. 60/891,816, entitled "Optical Multi-Discriminant LADAR", and filed Feb. 27, 2007, in the name of the inventor Bruno J. Evans and commonly assigned herewith is hereby claimed. This provisional application is also hereby incorporated by reference for all purposes as if set forth verbatim herein.

1. Field of the Invention

The present invention pertains to remote sensing and, more particularly, to an optical multi-discriminant LADAR imaging system.

2. Description of the Related Art

A need of great importance in military and some civilian operations is the ability to quickly detect and identify objects, frequently referred to as "targets," in a "field of view." A common problem in military operations, for example, is to detect and identify targets, such as tanks, vehicles, guns, and similar items, which have been camouflaged or which are operating at night or in foggy weather. It is important in many instances to be able to distinguish reliably between enemy and friendly forces. As the pace of battlefield operations increases, so does the need for quick and accurate identification of potential targets as friend or foe, and as a target or not.

Techniques for identifying targets have existed for many years. For instance, in World War II, the British developed and utilized radio detection and ranging ("RADAR") systems for identifying the incoming planes of the German Luftwaffe. RADAR uses radio waves to locate objects at great distances even in bad weather or in total darkness. Sound navigation and ranging ("SONAR") has found similar utility and application in environments where signals propagate through water, as opposed to the atmosphere. While RADAR and SONAR have proven quite effective in many areas, they are inherently limited by a number of factors. For instance, RADAR is limited because of its use of radio frequency signals and the size of the resultant antennas used to transmit and receive such signals. Sonar suffers similar types of limitations. Thus, alternative technologies have been developed and deployed.

One such alternative technology is laser detection and ranging ("LADAR"). Similar to RADAR systems, which transmit radio waves and receive radio waves reflected from objects, LADAR systems transmit laser beams and receive reflections from targets. Systems that both transmit signals and receive reflections, such as RADAR and LADAR, are known as "active systems." Because of the short wavelengths associated with laser beam transmissions, LADAR data exhibits much greater resolution than RADAR data.

Lasers are also used in "semi-active" laser ("SAL") systems. With the SAL system, a narrow laser beam is produced and transmitted toward a target. The laser radiation is typically generated and transmitted from a laser designator aircraft manned by a forward operator or by a ground-based operator. The operator directs the laser radiation to a selected target, thereby designating the target. The laser radiation reflected from the target can then be detected by the laser seeker head of a missile, aircraft, or other platform located remotely from both the target and the laser energy transmitter. Because the transmitter is not located on the same platform as the receiver, such systems are not considered "active" systems. Although SAL systems have proven effective, the next generation of receiver platforms are expected to fly to ranges well beyond those of imaging sensors on board the designator platform.

"Passive" systems are also employed. In passive systems, a detector is used to sense energy produced or reflected from the objects in the scene of interest. One example of a passive system is an infrared sensor that detects heat produced by objects. Alternatively, a light sensor, such as an array of photodiodes, may be used to sense the scene light reflected by the objects in the field of view. Passive, multi-spectral detection in narrow spectral bands is recognized to a highly effective approach for target detection in a thermally cluttered or camouflaged environment. Correlated hyper-spectral radiometric measurements in the atmospheric windows in the short wavelength infrared ("SWIR") and mid-wave infrared ("MWIR") bands have been shown to be effective in detecting low contrast, partially obscured and camouflaged targets. However, when considered in other applications, passive systems have been found to have a number of limitations. For instance, data provided by passive systems is sometimes difficult to interpret, since a given level of light intensity may indicate an object with low reflectivity, or the same intensity level may indicate a distant object with high reflectivity.

Various combinations of active, semi-active, and passive systems employing different radiation wavelengths have been attempted in the past. Each of these kinds of systems has certain advantages and disadvantages associated with them. For example, active LADAR systems facilitate ranging and imaging from which targets may be identified while SAL systems do not. But, active LADAR systems require lasers, optics, and electronics associated with transmission that SAL systems omit. Passive IR systems also omit these things, can be used for imaging, and omit even the receive optics of SAL systems, but they do not range like an active LADAR systems and cannot be used for homing like a passive semi-active laser-based system. Similarly, because of the wavelengths of the radiation employed, the performance of each technology varies in a given context not only on the mission scenario, but also responsive to environmental conditions. Balancing the constraints and drawbacks with the various technologies with their advantages can be very difficult when trying to combine them.

Thus, these combinations usually have many problems limiting their practicability. For instance, SAL systems do not have the advantages of passive infrared detection while suffering the limitations of active LADAR systems. Combined active LADAR and passive IR systems overcome this problem, but frequently suffer from other problems. For instance, space and weight limitations are usually severe because of the platform requirements on which the systems are deployed. Attempts to combine active LADAR and passive IR systems have problems with these constraints because, e.g., they employ separate optical trains or separate detectors for the LADAR and IR radiation.

In the past, systems have been developed that collect two-color LADAR data or polarized LADAR data. In some cases, the system also collects passive data through separate apertures. The Polarimetric Imaging Laser Radar ("PILAR") system is an example of a system that has a polarimetric LADAR, a passive MWIR imager, and a visible camera. They all use their own aperture and the data isn't collected simultaneously nor is it registered at the pixel level. In some cases, the system also collects passive data through separate apertures.

The present invention is directed to resolving, or at least reducing, one or all of the problems mentioned above.

SUMMARY OF THE INVENTION

The present invention, in its various aspects and embodiments comprises a optical multi-discriminant ("OMD") LADAR technique. The technique includes a method, comprising: receiving a dichroic, polarimetric optical signal simultaneously with radiation of a third wavelength from a field of view through a common aperture; and capturing three-dimensional, polarimetric data from each wavelength of the optical signal and two-dimensional data from the radiation. The technique also includes an apparatus, comprising: means for receiving a reflection of a polarimetric, dichroic optical signal and a second signal of a third wavelength, separating the optical signal from the second signal by wavelength, separating the dichroic constituents of the optical signal by wavelength, and separating the polarized elements of the dichroic constituents; and a common aperture through which the optical signal is transmitted and the reflection and the second signal are received.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will be appreciated that, in the development of any such actual embodiment, numerous implementation-specific decisions must be made to achieve the developers' specific goals. Such decisions may include compliance with system-related and business-related constraints that will vary from one implementation to another. Moreover, it will be appreciated that such a development effort, even if complex and time-consuming, would be a routine undertaking for those of ordinary skill in the art having the benefit of this disclosure.

Figure 1:
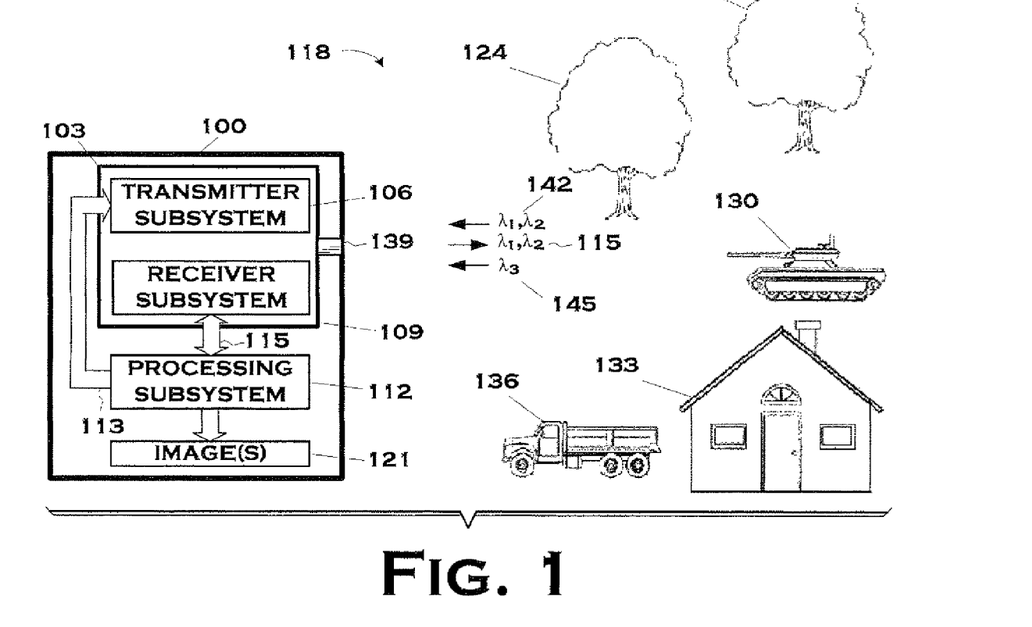
FIG. 1 is a system diagram incorporating the present invention conceptually illutrates the major operational parts of the system as used in a field environment.

FIG. 1 conceptually illustrates an imaging system 100 constructed and operated in accordance with the present invention. The imaging system 100 includes an integrated sensor package 103 (including a transmitter subsystem 106, a receiver subsystem 109, and a processing subsystem 112. The processing subsystem 112 is connected through a line 113 for operating the transmitter subsystem 106. The processing subsystem 112 is also connected through a bi-directional data and control line 115 to the receiver subsystem 109. In operation, the processing subsystem 112 processes data collected by the imaging system 100 from an exemplary scene 118 to generate one or more images 121.

The illustrated scene 118 includes trees 124 and 127, a military tank 130, a building 133, and a truck 136. The tree 124, tank 130, and building 133 are all located at the same distance from the imaging system 100. Note, however, that the scene 118 may have any composition. One application of the imaging system 100, as shown in FIG. 1, is to detect the presence of the tank 130 within the scene 118 under adverse conditions such as darkness, smoke, haze, and other barriers (such as the trees and building) which would prevent a direct visible optical viewing of the tank 130.

The transmitter subsystem 106 generates and transmits through a common aperture 139 a polarimetric, dichroic optical signal 115. The optical signal 115 is dichroic in that it comprises two constituents (not separately shown) defined by different wavelengths $\lambda_1$, $\lambda_2$. It is polarimetric in the sense that each of these constituents is polarized in both horizontal (azimuth) and vertical (elevation) directions. Note that the directions "horizontal" (or "azimuth") and "vertical" (or "elevation") are defined relative to the orientation of the imaging system 100 with respect to the illustrated scene 118.

A reflection 142 of the optical signal 115 is received through the common aperture 139. Note that, because the optical signal 115 originated from and the reflection 142 is received by the imaging system 100, the imaging system is therefore an "active" one. A second signal 145, having a third wavelength $\lambda_3$, is also received through the common aperture 139. This third wavelength $\lambda_3$ may be, for example, in the infrared band. Note that the second signal 145 does not originate from the imaging system 100. In this particular embodiment, it is passively collected, although it could be semi-actively collected in other embodiments. The receiver subsystem 109 receives, detects, and captures the optical signal 115 and the second signal 145.

As described in further detail below, the processing subsystem 112 of the imaging system 100 images the scene 118. More particularly, the processing subsystem 112 uses both two-dimensional, passively acquired data generated from the second signal 145 and three-dimensional, actively acquired data generated from the reflection 142 of the optical signal 115. Furthermore, the actively acquired data is acquired at two different wavelengths $\lambda_1$, $\lambda_2$ and the passively acquired data is acquired at a third wavelength $\lambda_3$. In the two-dimensional passive image data set, each pixel (picture element) includes passive intensity information corresponding to the magnitude of the passive energy collected for that pixel. In the three-dimensional active image data set, each pixel of the image has both range and active intensity data. In both the passive and active image data sets, discussed more fully below, each pixel has azimuth (horizontal) and elevation (vertical) coordinates.

Note that the image 121 may take many forms depending on the implementation of the present invention. The image 121 may be tangible or intangible, subject to human perception or not. For example, the image 121 may be intangible but subject to human perception, e.g., it may be displayed to an operator over a monitor (not shown). Or, it could be tangible and subject to human perception, e.g., a printed copy. Or, the image 121 could simply reside as a set of ordered data stored in some suitable data structure (not shown) awaiting handling or further processing.

The invention utilizes in one particular embodiment a two-color laser source where the output of the beams is polarized. The co-aligned beams are contemporaneously transmitted—i.e., simultaneously subject to routine error in implementation. When received, passive 3-5 micron data is directed to a receiver array to collect co-aligned passive infrared data. The passive receiver could also be in the visible spectrum or in the long wave infrared; or any combination of these. The active, two-color LADAR signal passes through a beam splitter. Each of the two wavelengths is split to two separate receivers. Each of the independent wavelength receivers splits the return into its two polarization components. These are processed separately.

Figure 2A:
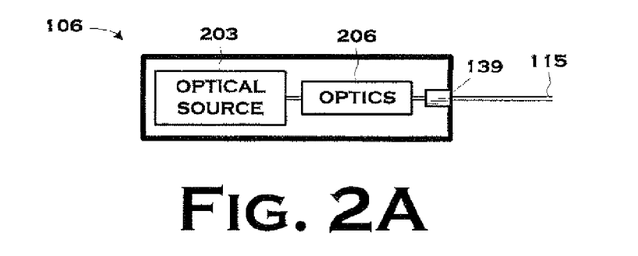
FIG. 2A-FIG. 2C are block diagrams of the transmitter, receiver, and processing subsystems of the imaging system shown in FIG. 1.
Figure 2B:
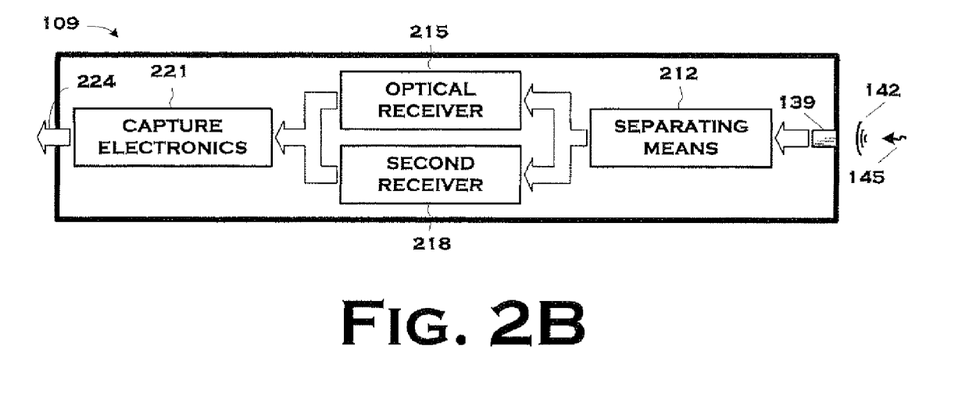
Figure 2C:
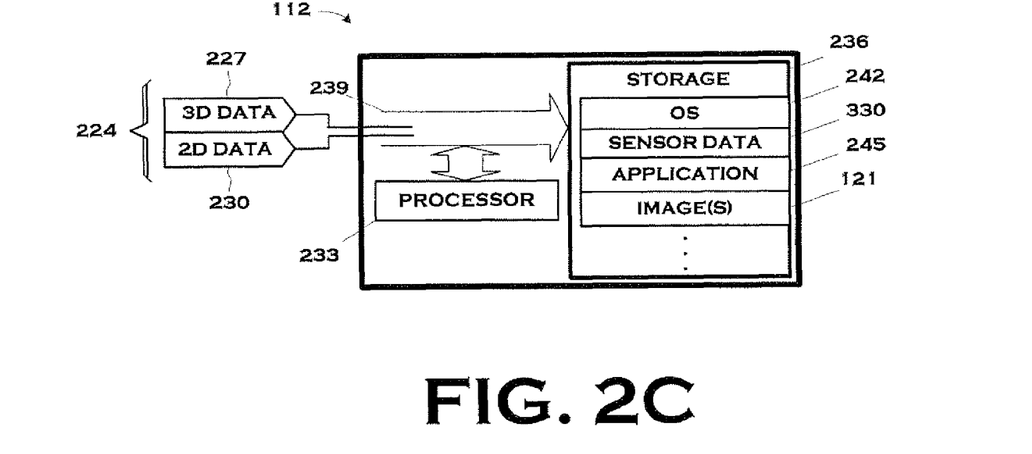

FIG. 2A-FIG. 2C are block diagrams of the transmitter, receiver, and processing subsystems 106, 109, 122, respectively, of the imaging system shown in FIG. 1. The transmitter subsystem 106, as shown in FIG. 2A, includes a source 203 capable of generating a polarimetric, dichroic optical signal 206 and a plurality of optics 209 for conditioning the optical signal 206 for transmission. The conditioned optical signal 115 is then transmitted through the common aperture 139. The receiver subsystem 109, as is shown in FIG. 2B, includes a separating means 212, an optical receiver 215, a second receiver 218, and capture electronics 221. The separating means 212 performs, in this particular embodiment, three separations: it separates the received reflection 142 of the optical signal 115 and the second signal 145, it separates the dichroic constituents (not yet shown) of the optical signal 115 by wavelength, and it separates the polarized elements (also not yet shown) of the dichroic constituents. The optical receiver 215 detects the separated polarized elements and the second receiver 218 detects the separated second signal 145. The capture electronics 221 then capture the detected signals.

The output 224, shown in FIG. 2B, of the capture electronics 221 comprises 3D data 227 and 2D data 230, both shown in FIG. 2C, that are input to the processing subsystem 112. The 3D data 227 is the data actively acquired from the optical signal 115 and its reflection 142 while the 2D data is the data passively acquired from the second signal 145. The processing subsystem 112 includes a processor 233 communicating with a storage 236 over a bus system 239. The processor 233 operates under the control of an operating system ("OS") 242 and executes an application 245, both of which reside on the storage 236. The application 245 operates on the sensor data 248 (i.e., the 3D data 227 and the 2D data 230 stored on the storage 236) to generate the image(s) 121 in accordance with conventional practice.

Note that the 2D, passively acquired data generated from the second signal 145 and 3D, actively acquired data generated from the reflection 142 of the optical signal 115 are collected at the same time through the common aperture 139. This may also be described in this context as being collected in parallel or simultaneously.

Figure 3:
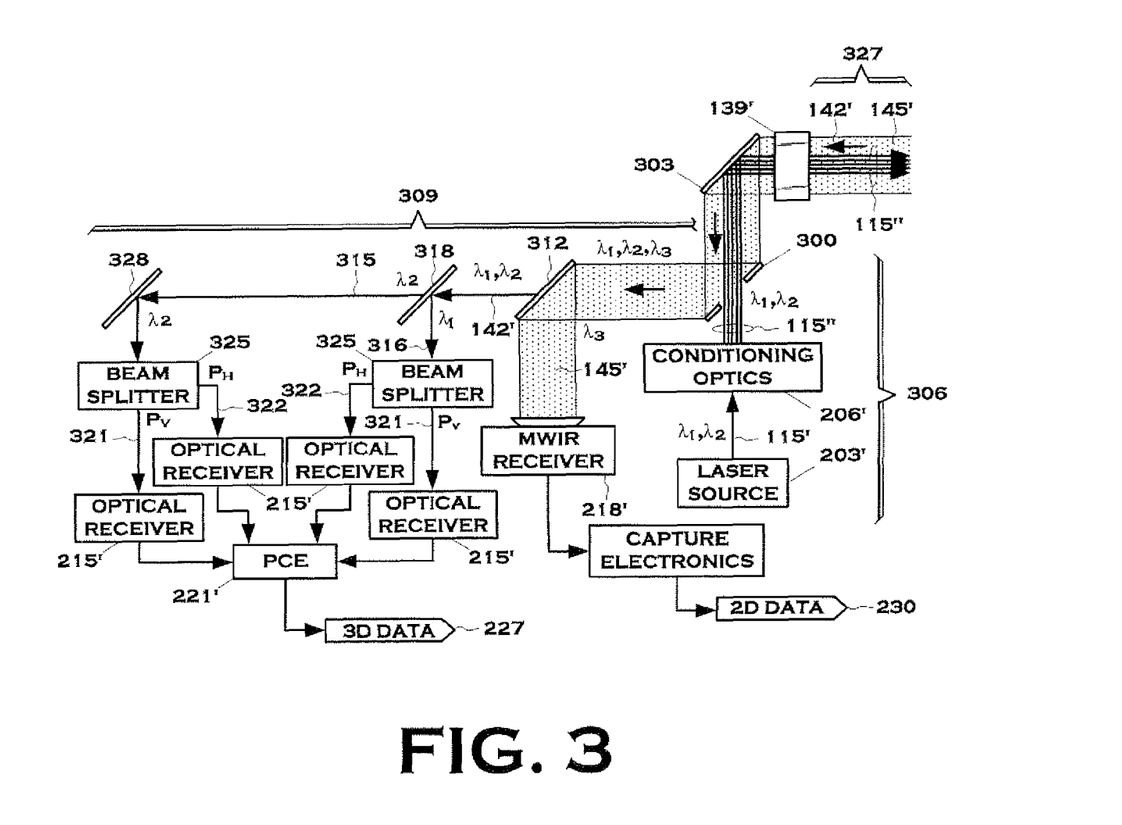
FIG. 3 conceptually illustrates the structure and operation of one particular embodiment of the imaging system shown in FIG. 1.

FIG. 3 conceptually illustrates the structure and operation of one particular embodiment of the transmitter subsystem 106 and the receiver subsystem 109 first shown in FIG. 1. The transmitter subsystem 106 of FIG. 2A comprises a laser source 203' and some conditioning optics 206'. The illustrated embodiment employs the LADAR transmitter developed by Lockheed Martin Corporation, the assignee hereof, and known as the Polarimetric Imaging Laser RADAR ("PILAR") or that of the Low Cost Autonomous Attack System ("LOCAAS"), both deployed by the United States military.

The laser source 203' is a two-color source with a polarized output. Some embodiments may provide outputs at 1.06 and 1.5 microns. Other embodiments may output at alternative wavelengths, such as 1.5 and 2.1 microns. The laser source 203' may be a single laser producing a single dichroic output or two separate lasers producing respective monochroic outputs that are then combined. The laser source 203' may be implemented using conventional pumped diode lasers or fiber lasers. However the laser source 203' is implemented, it emits a polarimetric, dichroic laser signal 115'.

The conditioning optics 206' comprise a number of conventional components, including a beam expander, a beam segmenter, a collimator, etc., none of which are shown in FIG. 3. One consequence of the beam segmenter is that that laser signal 115' is segmented into a plurality—e.g., five, six, or seven—beamlets 115". The embodiment of FIG. 3 splits the laser signals 115' into five beamlets 115". Each of the beamlets 115" is also polarimetric and dichroic. Split beam laser signals are known to have certain advantages over laser signals that are not split, or segmented. These advantages are well known to those skilled in the art. Accordingly, to exploit such advantages, the illustrated embodiment employs a split beam signal. However, the invention is not so limited and laser signals that are not split may also be used in alternative embodiments.

The beamlets 115" are then transmitted through a holed mirror 300, sometimes referred to as a transmit/receive switch, to a two-axis scanner 303. The two-axis scanner 303 scans the beamlets 115" into the field of view ("FOV") in both azimuth and elevation, or both horizontally and vertically. The operation of the scanner 303 may be controlled by the processing subsystem 112, shown in FIG. 1, or by a separate controller (not shown). The beamlets 115" are scanned into the FOV through the common aperture 139, which is a telescope in the illustrated embodiment.

Note that the aperture need not necessarily be implemented in any affirmative structure in all embodiments. Alternative embodiments may implement the common aperture 139 in other ways, including a simple opening in a housing, for example. A telescope is not required. The aperture is still common and is at the scanner; all beams exit and receive the system at this point and are aligned regardless of whether a telescope is in front of it. The telescope provides a larger aperture to collect photons (and increase signal-to-noise ratio ("SNR") to get better range performance) and the telescope also provides magnification to improve spatial resolution (if required).

Still referring to FIG. 3, as was described above, the beamlets 115" are reflected back to the imaging system 100. The reflections 142' are received through the common aperture 139. This particular embodiment also passively collects 2D data in the mid-wave infrared ("MWIR") band. The MWIR energy 145' is also received through the common aperture 139.

The holed mirror 300 reflects the received reflections 142' and the MWIR energy 145' away from the transmit path 306 toward the receive path 309. On the receive path 309, the MWIR energy 145' is first separated from the polarimetric, dichroic reflections 142' by a separator 312, after which the dichroic constituents 315, 316 are then separated by a dichroic 318. The dichroic constituents 315, 316 are then separated into their parametric elements 321, 322 by a respective parametric beam splitter 325. Note that the path of the dichroic constituent 316 in this particular embodiment includes an optional turn mirror 328. Note also that each of the dichroic constituents 315, 316, and therefore the parametric elements 321, 322, comprises a 1×n array, where n is the number of beamlets into which the transmitted signal 115' is segmented.

The separated MWIR energy 145' is then detected by the MWIR receiver 218'. The MWIR receiver 218' may be implemented using any suitable, commercially available, off-the-shelf detector known to the art. The parametric elements 321, 322 are also then detected by the optical receivers 215'. The optical receivers 215' may be implemented using any suitable technology known to the art, but the illustrated embodiment employs 1×n arrays of avalanche photodiodes (not shown).

The received energy 327 is then captured. The parametric elements 321, 322 are captured by the pulse capture electronics ("PCE") 221'. Suitable implementations are known to the art. For example, one technique is taught in U.S. Pat. No. 6,115,113, entitled, "Method for Increasing Single-Pulse Range Resolution", issued Sep. 5, 2000, to Lockheed Martin Corporation as assignee of the inventor Stuart W. Flockencier ("the '113 patent"). The MWIR energy 145' is captured by the capture electronics 221". Suitable implementations are also known to the art for this type of capture.

FIG. 4A-FIG. 4F are exploded, fragmentary mechanical diagrams in a perspective view of one particular implementation, i.e., an imaging system 400, of the embodiment of FIG. 3. Note, however, that the turn mirror 328, shown in FIG. 3, is omitted from this particular implementation. As those skilled in the art having the benefit of this disclosure will appreciate, features such as the turning mirror 328 are used to maintain optical alignment where size constraints do no permit direct optical alignment of the optical components. Those skilled in the art will appreciate other such variations in implementation arising from design constraints in a given context may be employed in alternative embodiments. However, for ease of illustration, FIG. 4A-FIG. 4F assume that direct optical alignment of components can be achieved so that features such as the turning mirror 328 may be omitted. Note also that the diagrams are exploded, and that in practice the apparatus will be much more compact due to tight size constraints on the illustrated embodiment.

Figure 4A:
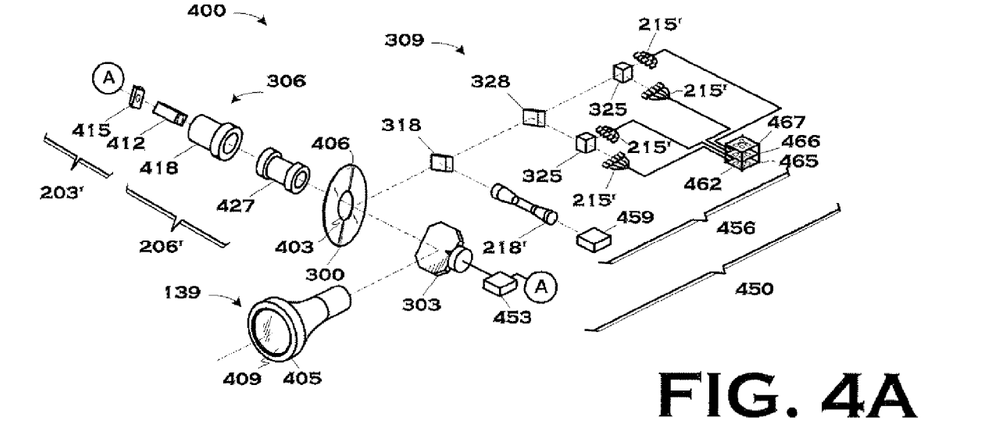
FIG. 4A-FIG. 4F are exploded, fragmentary mechanical diagrams in a perspective view of one particular implementation of the embodiment of FIG. 3.

FIG. 4A illustrates the transmit path 306 and the receive path 309. Note that, in operation, the implementation both transmits and receives at the same time. This capability is provided by the holed mirror 300. As is shown best in FIG. 4B, the holed mirror permits the laser signal 115 to be transmitted through the hole 403 while the mirrored surface 406 reflects the received energy 327 to the receive path 309. Note that FIG. 4B only illustrates this operation with the actively collected optical energy, but the passively collected energy is similarly reflected onto the receive path 309 by the holed mirror 300, as well.

In general, the imaging system 400 comprises several subsystems; the transmitter, the receiver, the optical system, the sensor electronics, and the system controller. The transmitter is a commercially available compact, high pulse repetition frequency ("PRF"), solid-state laser. The optical system fully scans the laser to sample the target with the angular resolution needed to meet the spatial resolution requirement. The optical system's telescope provides the collecting aperture for the receiver. The optical receivers are small arrays of avalanche photodiodes ("APDs"). For polarimetric imaging, an additional receiver array is added to the system. The sensor electronics control the laser, scanner, pulse signal processing, and all other sensor functions. In addition to these functions, it provides an interface to the system controller (located elsewhere).

Three components are common to both the transmit and receive paths 306, 309. The first of these is the common aperture 139. In the imaging system 400, the common aperture 139 is a telescope 405 and, more particularly, a refractive Galilean telescope with 6X magnification. The aperture 409 of the telescope is <15 cm because of implementation specific packaging constraints. For 8 km imaging, the required power aperture (per pixel) for the given transmitter and receiver is approximately 4 mj*cm^2. Starting with a fixed, 15-cm aperture, this means approximately 23 microjoules/pixel to meet the range requirement in clear weather. Since the design has a polarimetric receiver, the required pulse energy per pixel is doubled.

Because the common aperture 139 is used in both transmission and reception, the telescope selection should also consider design constraints imposed on the receive side 309, as well. In the imaging system 400, a narrow instantaneous field of view ("IFOV") requires a long focal length (>200 mm). The implementation-specific packaging constraints, however, imposes a shorter lens track. Thus, the lens track was reduced by 2X with a three-element telephoto design.

The second common component is the two-axis scanner 303. To achieve a 30 m×30 m frame size with 0.33-meter spatial resolution, a 90-pixel by 90-pixel image is collected. With the two-axis scanned, small array approach of the imaging system 400, the image frame size is controllable, giving the capability to meet this frame size requirement. The scanner speed is a 10 Hz frame rate with 70% scan efficiency. The two-axis scan approach allows the sensor to collect variable frame sizes if desired due to the flexibility provided by the scanning approach.

The third component common to both the transmit and receive paths 306, 309 is the holed mirror 300. The holed mirrors such as the holed mirror 300 are well known to the art. The aforementioned PILAR LADAR system uses one. The LOCAAS system does so, as well. The LOCAAS LADAR system is disclosed in, among others, U.S. Pat. No. 5,200,606, entitled, "Laser RADAR Scanning System", issued Apr. 6, 1993, to Lockheed Martin Corporation as assignee of the inventors Nicholas J. Krasutsky, et al. ("the '606 patent").

Figure 4B:
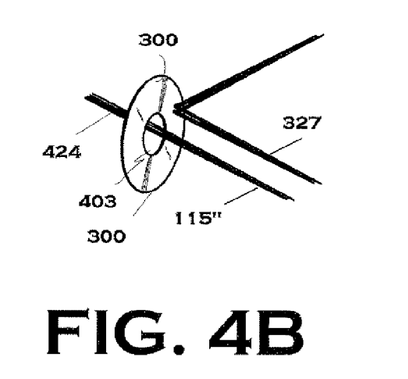

Turning now to the transmit path 306 as implemented in the imaging system 400 of FIG. 4A-FIG. 4B, it begins with the laser source 203'. The laser source 203' will preferably have a single fiber output, but a two output laser is acceptable. Matched pulse widths and simultaneous laser firing will be important considerations. The output beam 115' is segmented into several discrete "beamlets" 115" using techniques well known to the art. The optical signal will be scanned using the single mirror, two axis scanner 303, also as is known to the art. Controlling this scanner via software commands allows for variable FOVs up to the maximum scanner travel of greater than ±3°. This provides up to a 1024×1024 pixel image with 100 microradians spatial sampling.

The selection of the lasers is primarily driven by the system range requirement and the derived pixel data rate requirement. That is, it is a function of implementation specific considerations. In the illustrated embodiment, the laser source 203' comprises a single, dichroic laser 412, i.e., a laser that will generate a laser signal comprised of two different wavelengths $\lambda_1$, $\lambda_2$. Because the return path 309 will split the returns by wavelength, the wavelengths $\lambda_1$, $\lambda_2$ should be separated enough so they can be split by the dichroic element 318. Furthermore, because the illustrated embodiment employs polarimetric discriminants, each wavelength $\lambda_1$, $\lambda_2$ needs to be distinctively polarized. Suitable lasers are known to the art and any such suitable laser may be used. Furthermore, "white" lasers that generate laser signals including components distributed across the visible spectrum are also known, and these may be used in some embodiments.

However, one particular embodiment employs two separate lasers. One particular embodiment employs fiber lasers commercially available from Aculight Corporation at 22121 20th Avenue SE, Bothell, Wash. 98021, telephone: (425) 482-1100, facsimile: (425) 482-1101 or from their site on the World Wide Web of the Internet at < http://www.aculight.com/index.htm>. Other fiber lasers, such as those disclosed in U.S. application Ser. No. 10/886,976, entitled, "FIBER LASER RADAR", filed Jul. 8, 2004, in the name of the inventors Christopher E. Michael, et al. and commonly assigned herewith, may also be used. Suitable lasers are commercially available from BAE Systems, PLC, which has a registered office at 6 Carlton Gardens, London SW1Y 5AD, United Kingdom. Additional information regarding BAE Systems and the products it offers, such as the instant lasers, is available over the World Wide Web of the Internet at http://www.baesystems.com/.

Figure 4C:
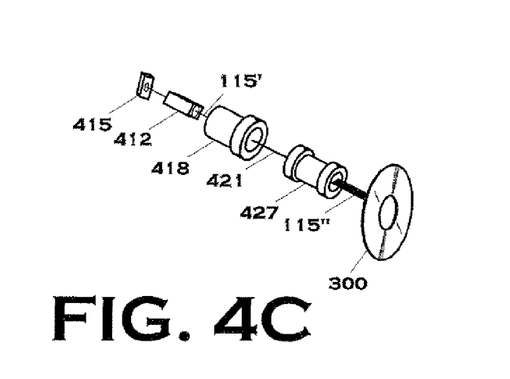

The laser 412 is a diode pumped solid-state Q-switched device. The operation of such lasers is generally described in the aforementioned '606 patent. Suitable solid-state laser types include, for example, Neodymium doped Indium ("Nd:I"), Neodymium doped yttrium lithium fluoride ("Nd:YLF"), Neodymium doped yttrium aluminum garnet ("Nd:YAG"), or Neodymium doped yttrium vanadium oxate ("Nd:YVO$_4$"). The solid-state laser 412 is pumped by an external, remotely located diode laser 415. Suitable diode laser include, for example, a gallium aluminum (GaAlAs) diode laser.

Thus, as is best shown in FIG. 4C, a pumping laser 415 pumps a solid state laser 412, which emits the laser signal 115'. The pumping laser 415 produces a continuous signal of wavelengths suitable for pumping the solid state laser 412, e.g., in the crystal absorption bandwidth. The pumping laser 415 has an output power, suitably in the 10-20 watt range, sufficient to actuate the solid state laser 412. The solid state laser 412 produces pulses with widths of 10 to 20 nanoseconds, peak power levels of approximately 10 kilowatts, and at repetition rates of 10-120 kHz. The equivalent average power is in the range of 1 to 4 watts. The preferred range of wavelengths of the output radiation is in the near infrared range.

The pulsed laser signal 115' is then expanded. More particularly, the beam expander 418 expands the diameter of the laser signal 115' to provide an expanded beam 421 while decreasing its divergence. The illustrated beam expander 418 is a therefore a four-element design. In some embodiments, the beam expander 418 may comprises a series of (negative and positive) lenses (not shown). The expanded beam 421 is then segmented, or split, into five segments, or beamlets 115" by a beam splitter 427. As will be discussed further below, the receiver design is a six-element fiber bundle array.

Returning now to FIG. 4A, to achieve the pixel data rate needed to meet the desired system frame size and frame rate for this particular implementation, the two-axis scanned, high PRF transmitter approach is coupled with a five-element linear array receiver design. In general, to ensure simple interlacing for high resolution, an odd number of receivers is desirable. The receiver is co-aligned with the transmitter using a transmit/receive switch (e.g., the holed mirror 300) prior to the scan mirror. The receiver consists of a narrow band filter, imaging lens, and the detector array. The imaging lens is diffraction limited to insure all the received energy is focused on the detectors. The return laser pulse is split between the two channels by a polarizing beam splitting cube.

More particularly, turning to the receive path 309 in FIG. 4A, the imaging system 400 includes two pairs of optical receivers 215' and a MWIR receiver 218'. The optical receivers 215' and the MWIR receiver 218' may be implemented using any suitable technology known to the art. A brief description of the implementation of each of these components in the illustrated embodiment follows.

Figure 4D:
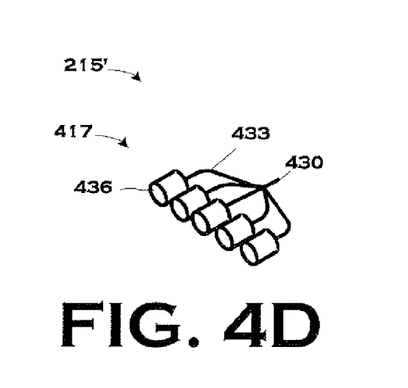

In the illustrated embodiment, each optical receiver 215' comprises a pair of 1×5 fiber optic receiver arrays 417, shown better in FIG. 4D. In each pair, one optical receiver 215' detects the $\lambda_1$ energy and the other detects the $\lambda_2$ energy. Each wavelength $\lambda_1$, $\lambda_2$ will have a set of matched receivers to collect the horizontal ("H") and vertical ("V") polarization signatures.

Each optical receiver 215' is actually a bundle 430 of optical fibers 433 (only one indicated); each connected to a discrete detector 436 (only one indicated). Although not shown, there typically will be at least one extra detector 436 to feed a "back scatter" detector (also not shown) to provide the time at which the laser pulse actually departs the system. This removes the laser fire jitter to help accurately determine the laser time of flight. The detectors 436 are silicon avalanche photodiode ("APD") such as are known to the art for this purpose. They are made using a double-diffused "reach through" structure. The APDs are designed such that their long wave response ($\lambda$>900 nm) has been enhanced. The APDs of the illustrated embodiment do not have an integrated preamp. A low-noise amplifier (not shown) is used on the receiver board to provide signal gain.

Returning to FIG. 4A, the MWIR receiver 218' may be implemented using any suitable MWIR receiver known to the art. MWIR receivers are very common in the art. For example, L-3 Communications Cincinnati Electronics makes several that may be suitable for various applications. They can be reached at 7500 Innovation Way, Mason, Ohio 45040-9699 USA, ph.: 513.573.6100 or 800.543.8220. Additional information can be found on their website http://www.cinele.com/ on the World Wide Web of the Internet. The identification of which one will be "suitable" in any given embodiment will depend on implementation-specific design constraints. Those skilled in the art having the benefit of this disclosure will be able to readily identify such a suitable MWIR receiver 218'.

The receive path 309 includes two separations by wavelength performed by the dichroic 312 and dichroic 318. The separations are performed with a dichroic material. A dichroic material is a wavelength splitter and can be many things, depending on what wavelengths you want to separate. For example, the germanium optics of most long-wave infrared imagers passes the long wave radiation but reflects visible light. Typical window glass on the other hand has the opposite effect; passing visible but reflecting the long wave radiation. Suitable dichroic materials and their use are known to the art and are readily commercially available. Note that the selection of the dichroic material may be impacted by the wavelengths of the received energy. Any suitable dichroic material for the wavelengths involved may be employed.

Each of the dichroic constituents 315, 316 is separated into its polarimetric elements 321 by virtue of their polarization by a respective polarimetric beam splitter 325. The illustrated embodiment employs a cubic splitter commercially available off the shelf from Lambda Research Optics, Inc., who may be contacted at 1695 West MacArthur Blvd., Costa Mesa, Calif. 92626, telephone: (714) 327-0600, facsimile: (714) 327-0610, and Email: Lambda@Lambda.cc, or over their site on the World Wide Web of the Internet at http://www.lambda.cc/.

The system electronics 450 include the sensor electronics 453 and the detector electronics 456. The detector electronics 456 comprise the infrared ("IR") electronics 459 and the LADAR electronics 462. The sensor electronics 453 control the laser, scanner, pulse signal processing, and all other sensor functions. In addition to these functions, it provides an interface to the system controller (not shown) The system controller may be a computing apparatus connected to the sensor electronics via a typical interface, such as an Ethernet connection.

The sensor electronics 453 consists of commercially available PC/104 format electronic boards (not individually shown) such as are known to the art populated in accordance with the present invention. It is a Windows based operator interface that includes on-screen control of the sensor system, as well as displaying the collected data. The core software is written in ANSI C/C++ so that it can easily be hosted on other platforms. The sensor electronics 453 interfaces with the sensor system and the platform.

Figure 4E:
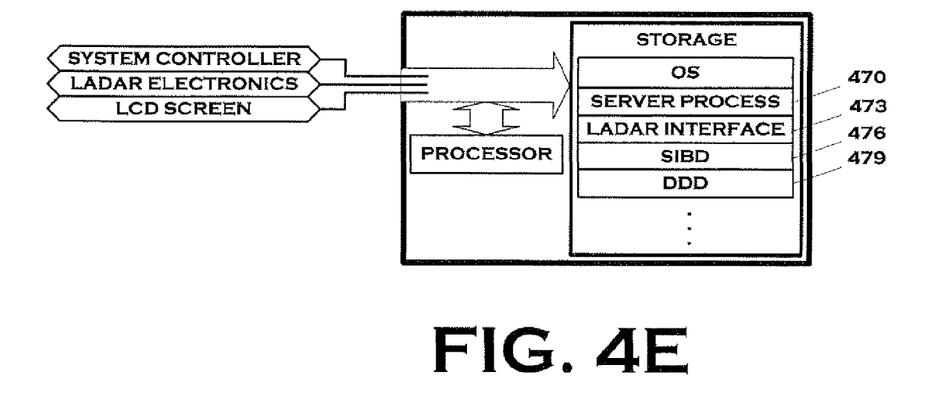

The software for the sensor electronics 453, as is shown in FIG. 4E, includes a Server Process 470, LADAR Interface 473, Serial Interface Board Driver ("SIBD") 476, and Diagnostic Display Driver ("DDD") 479. The Server Process 470 communicates with the System Controller through Hyper Text Transfer Protocol ("HTTP") requests and responses over an Ethernet interface. It also assesses commands to the LADAR Interface 473. The LADAR Interface 473 polls the server process 470 for work to do, receives and processes commands from the server process 470, returning status and data, calls the SIBD 476 to transmit to the LADAR Electronics 462, polls SIBD 476 for received data, returns status and diagnostic data to server process 470, and writes LADAR data to a file or memory object. The SIBD 476 runs in background and handles requests to write to and read from the LADAR electronics 462. The Diagnostic Display Driver 479 communicates with the Server Process 470 for diagnostic and status information and writes to the LCD screen.

The sensor electronics 453 communicate with the LADAR electronics 462 via a custom serial interface board (not individually shown). The LADAR electronics 462 comprise a three-board stack consisting of boards 465-467 for the polarimetric receiver electronics ("PRE"), the polarimetric data combiner ("PDC"), and the pulse capture electronics ("PCE"), respectively, shown best in FIG. 4F.

Figure 4F:
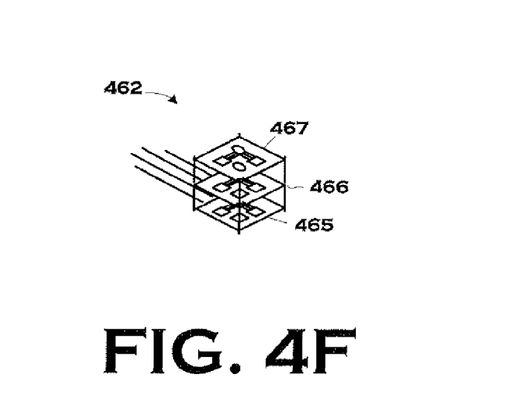

Turning now to the PRE 465, each pair of optical receivers 215' images the same pixel, but receives a different amount of energy depending on the polarization of the return signal. The PRE 465 receives 27 optical inputs via fiber (12 pairs plus backscatter). The detectors 436 convert optical power (watts) to electrical current (amps). A low-noise transimpedance amplifier (not shown) converts the current to voltage. The 27 analog signals (voltages) are sent to the PDC board 466.

The PRE 465 captures the received reflections 142'. For polarimetric data collection, the signals are normalized. An attenuator (not shown) is used to reduce the signal level during the outgoing laser pulse time. This keeps the energy of the backscatter below the saturation level of the electronics, allowing use of this signal to match the gains of the channel pairs. The gain matching is accomplished using the voltage controlled amplifiers. In addition, the bias of each detector 436 is set individually and each is temperature controlled.

The PDC 466 provides the polarimetric peak detection logic and sums the detector pair outputs prior to range processing. The peak detector holds the intensity data for capture. The peak values provide the polarimetric information. In addition, the PDC board 466 monitors the backscatter energy on each channel. This data is used to control the gain on the channel pairs. The PDC provides a peak detector (not shown) to hold the intensity data for capture by an analog-to-digital converter ("ADC") (not shown). The ADC provides 12-bits of resolution. To normalize the polarimetric channels, the backscatter energy is monitored. It is used to control the gain of each channel pair. The gain is changed by providing the new gain to the voltage controlled amplifiers on the PRE.

The data to set the initial polarimetric channel gains will be downloaded to the PDC. This sets the initial noise levels for the PCE comparators. This is done in lieu of tweaking the voltage on each individual detector 436. In order to recover some of the lost range performance from the splitting of the return signal, the channel pairs are summed prior to sending the data to the PCE. This is done using a low-noise summing amplifier.

The signal processing approach employed by the PCE for analyzing return laser pulses implements a well-established direct detection algorithm in this particular implementation. It accurately determines time of flight (absolute range) and relative reflectivity (intensity) under varying conditions of range, reflectivity, atmospheric attenuation, obliquity, multiple returns and noise. This signal processing approach provides range accuracy and range resolution, as well as providing the capability to resolve multiple returns to see through foliage and camouflage nets.

More particularly, this signal processing approach continuously digitizes and processes the detector output in real-time. The return signal is captured and stored in memory. The data is passed through a convolution peak detector function to extract the pulse position from the data. The entire captured pulse is used to minimize the effects of signal strength variation, noise and distortions. A programmed template, designed to match the nominal pulse shape, is convolved with the data in steps of 2X the sample rate. When the data most accurately matches the template, the convolver output is at a maximum, giving the pixel's absolute range. The maximum convolver output value at this point is proportional to the return pulse energy. Because many data samples are used at each template step to generate the convolver's output, available signal-to-noise is used to best advantage.

The signal processing approach briefly described above is more fully disclosed in U.S. Pat. No. 6,115,113, entitled, "Method for Increasing Single-Pulse Range Resolution", issued Sep. 5, 2000, to Lockheed Martin Corporation as assignee of the inventor Stuart W. Flockencier. However, the invention is not so limited. Any suitable technique known to the art and capable of meeting implementation-specific design constraints may be employed in alternative embodiments.

Figures 5A, 6:
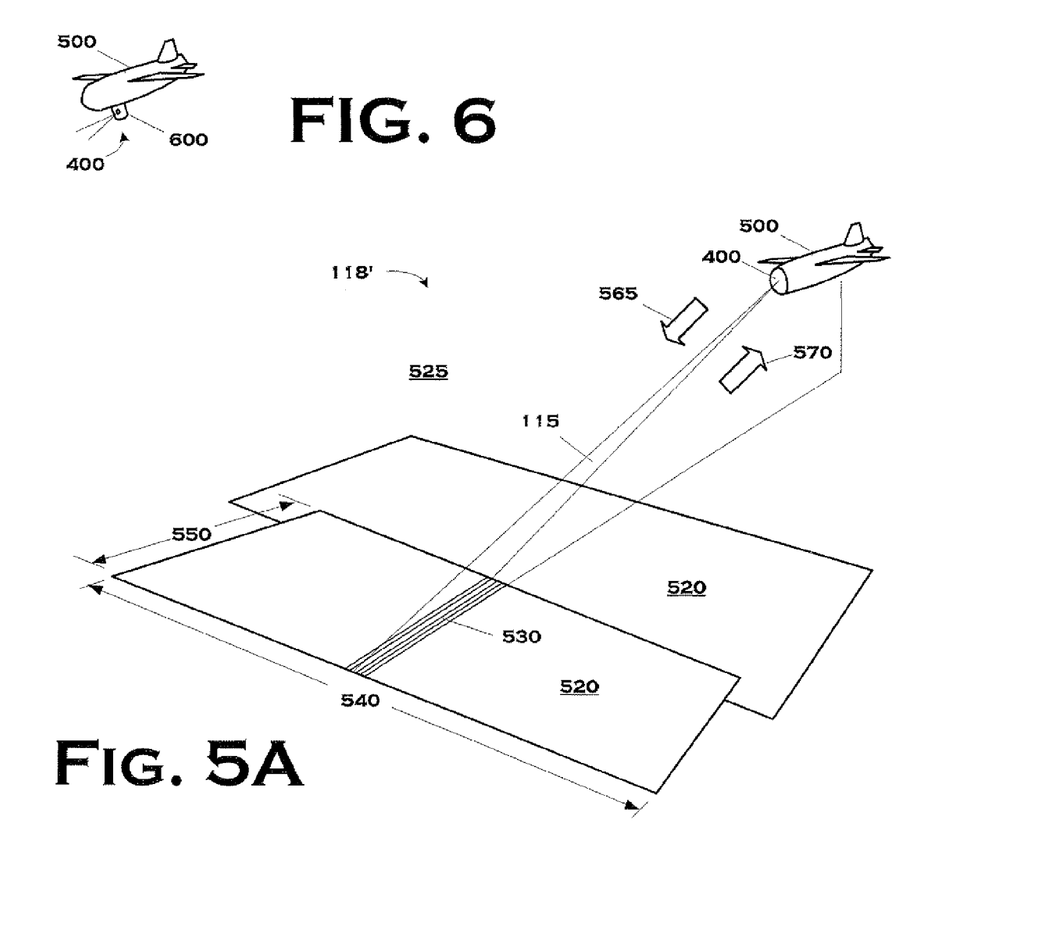
FIG. 5A-FIG. 5D depict the operation of the imaging system of FIG. 4A-FIG. 4F.
FIG. 6 illustrates a mounting technique alternative to that shown in FIG. 5A.

Turning now to its operation, the imaging system 400 is mounted to a platform such as the aerial platform 500, shown in FIG. 5A. The imaging system 400 is mounted to the front end of the platform 500 in FIG. 5A, but the invention is not so limited. The imaging system 400 may, for example, be mounted in a turret 600 positioned on the underneath of the platform 500 as is shown in FIG. 6. Note that the place and manner of the mounting may impact certain aspects of the imaging system 400. For example, the turret 600 in FIG. 6 may be used to scan the imaging system 400 in azimuth if desired.

Furthermore, the invention is not limited to applications with any particular type of aerial vehicle or even aerial vehicles. The platform 500 is a guided submunition, but could alternatively be, for example, an unmanned aerial vehicle ("UAV") or a manned aircraft. Similarly, the platform could be a terrestrial platform such as a vehicle—manned or unmanned—or some kind of facility. The platform 500 could also be a water-borne vehicle, such as a ship. The present invention is not limited by the implementation of the platform.

The imaging system 400 collects data from a field of view 525 as it moves through the scene 118'. The laser signal 115 is transmitted by an optics package (not shown) of the LADAR transceiver 500 on the platform 510 to scan a geographical area called a scan pattern, or "footprint", 520. Each scan pattern 520 is generated by scanning elevationally, or vertically, several times while scanning azimuthally, or horizontally, once within the field of view 525. Thus, each footprint 520 is defined by a plurality of elevational scans elevational scans 530 and azimuthal scans 540. The principal difference between the successive footprints 520 is the location of the platform 510 at the start of the scanning process as the platform 510 moves in the direction of an arrow 565. The velocity, depression angle of the sensor with respect to the horizon, and total azimuth scan angle of the LADAR platform 510 determine the footprint 520 on the ground.

The laser signal 115 is a pulsed, dichroic, polarimetric laser signal as described above and, in this particular embodiment, a split beam signal. Note that some alternative embodiments may forgo splitting the beam and may use a single beam signal. Because of many inherent performance advantages, split beam laser signals are typically employed by most LADAR systems. As described above, a single beam may be split into several beamlets spaced apart from one another by an amount determined by the optics package (not shown) aboard the platform 510 transmitting the laser signal 115. Each pulse of the single beam is split, and so the laser signal 115 transmitted during the elevational scan 550 in FIG. 5A is actually, in the illustrated embodiment, a series of grouped beamlets.

The optics package aboard the platform 510 transmits the laser signal 115 while scanning elevationally 550 and azimuthally 540. More particularly, as is more fully shown in FIG. 5B, the laser source 412 is stimulated to emit the laser signal 580 that the beam expander 418 then shapes. The expanded beam 421 is then split by the beam splitter 427 to produce the beamlets 424, which are transmitted through the hole 403 in the holed mirror 300 to the scanner 303. The scanner 303 then scans the laser signal 115 in both azimuth and elevation into the field of view 525.

Figure 5B:
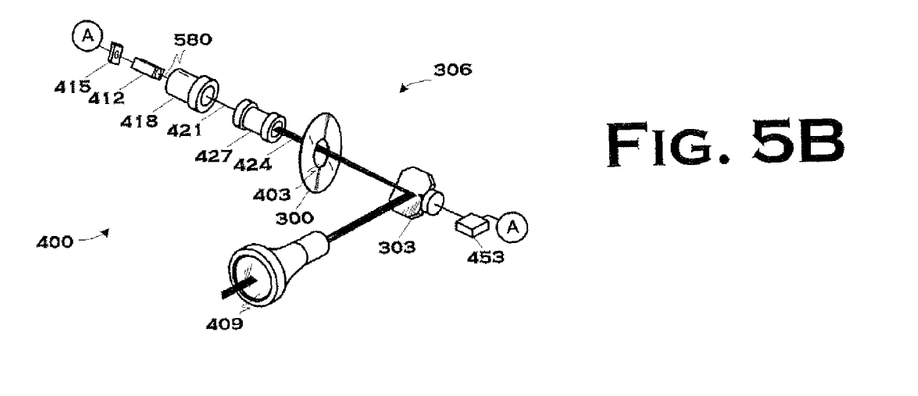
Figure 5C:
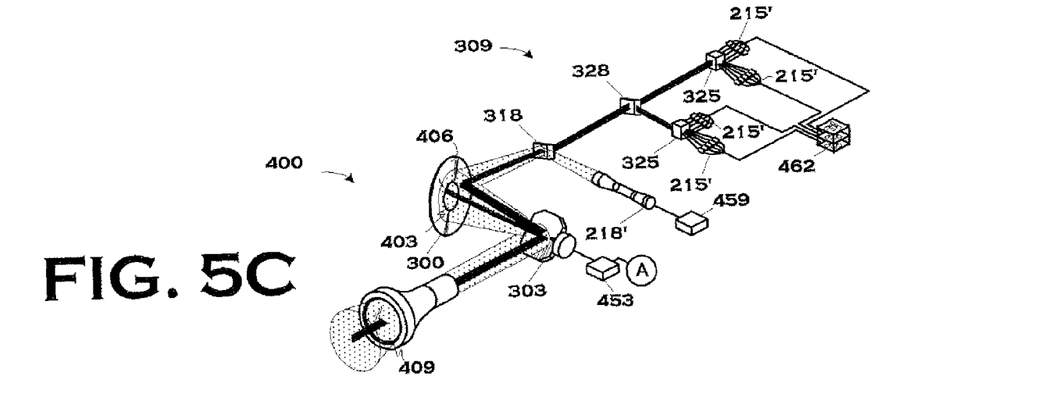
Figure 5D:
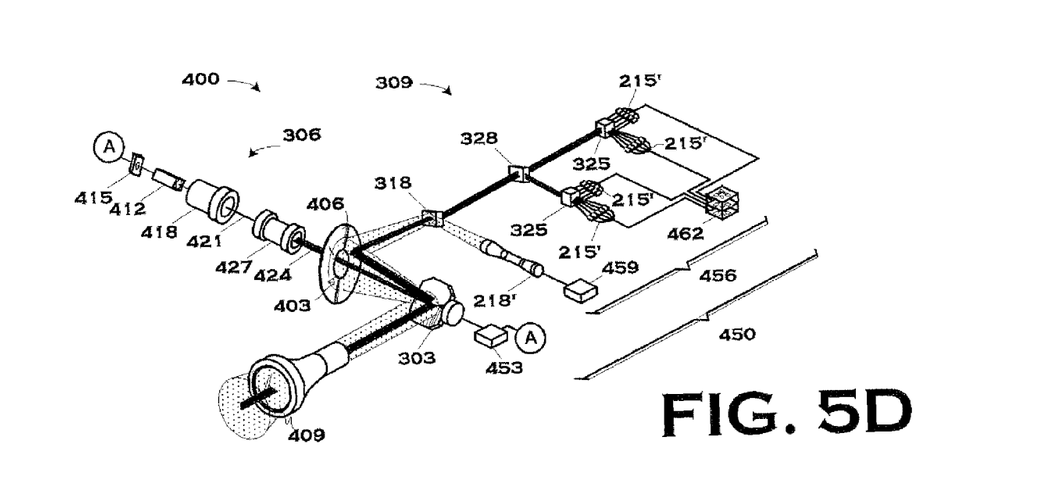

The laser signal 115 is continuously reflected back to the platform 510, which receives the reflected laser signal. The acquisition technique described above is what is known as a "scanned" illumination technique. Note that alternative embodiments may acquire the LADAR data set using an alternative technique known as "flash" illumination. However, in scanned illumination embodiments, auxiliary resolution enhancement techniques such as the one disclosed in U.S. Pat. No. 5,898,483, entitled "Method for Increasing LADAR Resolution," issued to Apr. 27, 1999, to Lockheed Martin Corporation as assignee of the inventors Edward Max Flowers, ("the '483 patent") may be employed.

This transmit and receive can, in the illustrated embodiment, be performed in two different modes. In the "fast scan" mode, each pixel will be sampled once. In this mode, the scanner moves the 1×5 array 5 pixels in azimuth with each laser pulse. This provides a pixel data rate that is 5X the laser PRF. For data collections that just require 3-D signatures with intensity (no multi-color or polarimetric signature), this provides a convenient (and fast) means to collect data. Two-color and polarimetric signatures are available, but this will require matching and characterizing the detectors on the receivers.

In the "high quality" mode, each pixel is sampled 5 times. In this mode, the scanner moves the 1×5 array a single pixel in azimuth with each laser pulse as shown in the figure to the right. The intensities for each color and the polarimetric intensities can be averaged (in software; all data is saved) to provide improved signature data. If pulse averaging isn't desired, this mode provides 5 distinct images for each of the detector pairs.

In both modes, the spatial resolution can be improved by a factor of two. In the "fast scan" mode, the scanner moves the 1×5 receiver array by 2½ pixels. In the "high quality" mode, the scanner moves the 1×5 receiver array by ½ pixels. In both modes, the elevation scanner speed is halved.

FIG. 5A also conceptually illustrates the passive acquisition of infrared data from the same field of view 525 in which the footprints 520 are defined. The infrared data is extracted from the passive detection of infrared electromagnetic radiation, represented by the arrow 570. The radiation 570 may be, e.g., light waves reflected from or thermal emissions of objects (e.g., the tank 130, building 133, truck 136, in FIG. 1) within the field of view 525. The radiation 570 will be multispectral, i.e., it will include electromagnetic waves of many frequencies. The radiation 570 comprises a portion of the scene conditions within the field of view 525, and do not result from any transmission from the platform 510. Hence, the waves 570 are "passively" detected. As used herein, the phrase "scene radiation" shall mean any radiation existing within the field of view but not having been actively introduced by the imaging system 400.

Returning to FIG. 1, both the passive image data set and the near simultaneously collected active LADAR image data set are transmitted via the line 145 to the processing subsystem 112. Within the processing subsystem 112, data from both the passive image data set and the active image data set are combined to produce a multi-dimensional image data set. Because the passive and active image data sets are collected by the same sensor assembly at approximately the same time (i.e., are temporally aligned), the pixels within the two image data sets are also spatially aligned, that is, objects in the line 145 are in the same positions x and y for both the passive image and the active LADAR image.

The optical system provides the means to transmit and receive laser pulses. The large aperture allows long range imaging with the available transmitter and receiver. The optical system also generates the 42 microradians angular resolution data required to meet the spatial resolution requirement by controlling beam divergence and utilizing a single mirror, two-axis scanner. The scanner provides the speed to meet the 10 Hz frame rate requirement.

Figure 7:
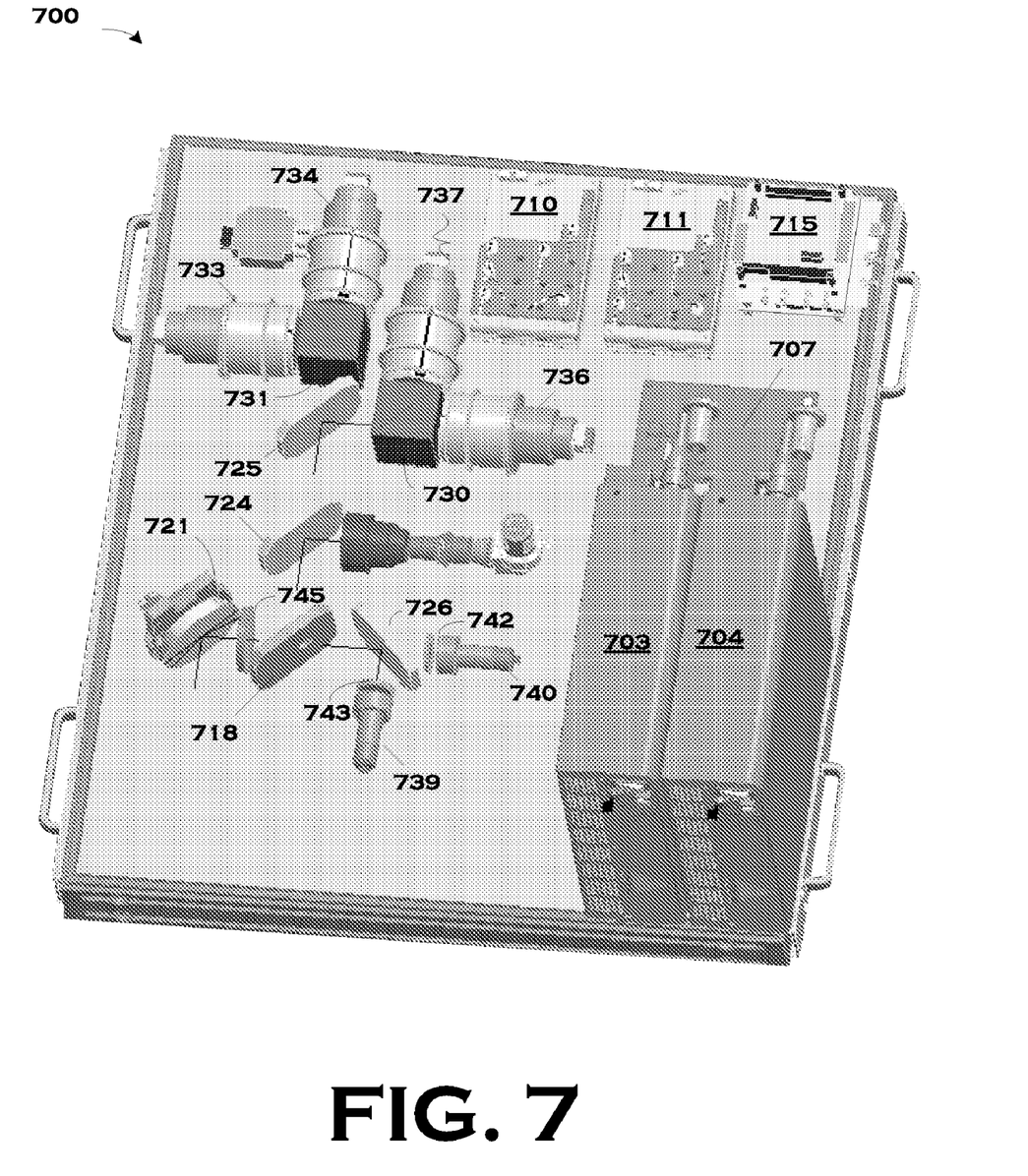
FIG. 7 depicts a breadboard implementation of an alternative embodiment.

As was mentioned earlier, implementations will typically be more compact that the exploded versions shown above. FIG. 7 illustrates an actual breadboard design 700 illustrating this principle. Many of the components are the same as those discussed above. Note, however, that this breadboard design 700 employs two separate lasers 703, 704, one for each wavelength $\lambda_1$, $\lambda^2$. The breadboard design 700 also includes MWIR electronics 707, $\lambda_1$ electronic 710, $\lambda^2$ electronics 711, and a sensor controller 715. Other components familiar from the discussion above include the holed mirror 718, a two-axis scanner 721, dichroics 724-726, polarimetric beam splitters 730-731, $\lambda_1$ optical receivers 733-734, $\lambda_2$ optical receivers 736-737, and beam collimators and segmentors 739-740. The breadboard design 700 also includes two half wave plates 742-743 and a quarter wave plate 745.

The invention admits wide variation in many aspects of the structure of the imaging system 100. For example, charge-couple device ("CCD") cameras may be used instead of the MWIR receiver. Still other variations will become apparent to those skilled in the art having the benefit of this disclosure.

The optical multi-discriminant ("OMD") LADAR therefore addresses the need for an integrated approach that is focused on a system capable of transmitting and receiving several sensing modalities. It employs an integrated approach versus the use of multiple, independent systems to collect and characterize multiple optical signatures simultaneously. This approach provides correlated, real-time data to detect man-made objects and discriminate them from the background, particularly in highly cluttered environments. The approach may provide additional data to identify camouflage nets, recently disturbed earth (e.g., associated with buried improvised explosive devices), etc.

This approach therefore provides a method for combining multiple discriminants (e.g., two color, polarimetric, and passive) in a single, compact system. In addition, it provides more than two discriminants in a single system where the data is registered and collected at the pixel level. Problems with two-color and polarimetric receivers is that the signatures vary with atmosphere and pulse-to-pulse laser variations. This approach utilizes a time-domain-integration ("TDI") approach for the active LADAR signatures (similar to scanned forward looking infrared, or "FLIR", techniques). This provides an averaging of multiple pulses to improve the quality of the multi-discriminant data.

The following U.S. Letters Patent are hereby incorporated by reference for the teachings set forth below as if expressly set forth verbatim herein:

U.S. Pat. No. 5,200,606, entitled, "Laser RADAR Scanning System", issued Apr. 6, 1993, to Lockheed Martin Corporation as assignee of the inventors Nicholas J. Krasutsky, et al., for its teachings regarding the structure and operation of the LADAR components disclosed therein and, especially, the holed mirror, and regarding the gimbaling of the sensor package;

U.S. Pat. No. 5,644,386, entitled, "Visual Recognition System for LADAR Sensors", issued Jul. 1, 1997, to Loral Vought Systems Corp. as assignee of the inventors Gary K. Jenkins, et al., for its teachings regarding imaging in processing and display;

U.S. Pat. No. 5,682,225, entitled, "Ladar Intensity Image Correction for Laser Output Variations", issued Oct. 28, 1997, to Loral Vought Systems Corp. as assignee of the inventors David S. DuBois, et al., for its teachings regarding imaging in processing and display;

U.S. Pat. No. 5,852,492, entitled, "Fused Lasar Range/Intensity Image Display for a Human Interpretation of Lasar Data", issued Dec. 22, 1998, to Lockheed Martin Vought Systems Corp. as assignee of the inventors Donald W. Nimblett, et al., for its teachings regarding imaging in processing and display;

U.S. Pat. No. 5,893,085, entitled, "Dynamic fuzzy logic process for identifying objects in three-dimensional data", issued Apr. 6, 1999, to Lockheed Martin Corporation as assignee of the inventors Ronald W. Phillips, et al., for its teachings regarding imaging in processing and targeting;

U.S. Pat. No. 5,898,483, entitled, "Method for Increasing LADAR Resolution", issued Apr. 27, 1999, to Lockheed Martin Corporation as assignee of the inventor Edward Max Flowers, for its teachings regarding increasing LADAR resolution;

U.S. Pat. No. 6,115,113, entitled, "Method for Increasing Single-Pulse Range Resolution", issued Sep. 5, 2000, to Lockheed Martin Corporation as assignee of the inventor Stuart W. Flockencier, for its teachings regarding pulse capture;

U.S. Pat. No. 6,323,941, entitled, "Sensor Assembly for Imaging Passive Infrared and Active LADAR and Method for Same", issued Nov. 27, 2001, to Lockheed Martin Corporation as assignee of the inventors Bruno J. Evans, et al., for its teachings regarding imaging in processing and display;

U.S. application Ser. No. 10/886,976, entitled, "Fiber Laser RADAR", filed Jul. 8, 2004, in the name of the inventors Christopher E. Michael, et al., for its teachings regarding the design and use of fiber lasers for LADAR systems.

Each of these U.S. Letters Patent and U.S. patent applications is commonly assigned herewith.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:
    receiving a dichroic, polarimetric optical signal in parallel with radiation of a third wavelength from a field of view through a common aperture; and
    capturing three-dimensional, polarimetric data from each wavelength of the optical signal and two-dimensional data from the radiation.

2. The method of claim 1, further comprising generating the optical signal.

3. The method of claim 2, wherein generating the optical signal includes generating an optical signal on board the platform on which the optical signal is transmitted.

4. The method of claim 2, further comprising transmitting the generated optical signal through the common aperture.

5. The method of claim 1, further comprising illuminating an object in the field of view, the designation comprising the optical signal.

6. An apparatus, comprising:
    means for receiving a dichroic, polarimetric optical signal simultaneously with radiation of a third wavelength from a field of view through a common aperture; and
    means for capturing three-dimensional, polarimetric data from each wavelength of the optical signal and two-dimensional data from the radiation.

7. The apparatus of claim 6, wherein the receiving means comprises:
    means for separating a received reflection of the optical signal and a second signal having a third wavelength, for separating the dichroic constituents of the optical signal by wavelength, and for separating the polarized elements of the dichroic constituents;
    an optical receiver for detecting the separated polarized elements of the separated dichroic constituents; and
    a second detector for detector the separated second signal.

8. The apparatus of claim 6, wherein the capturing means comprises capture electronics for capturing the detected polarize elements and the detected second signal.

9. The apparatus of claim 6, further comprising means for imaging a scene in the field of view from at least one of the two-dimensional data and the three-dimensional data.

10. The apparatus of claim 6, further comprising means for generating the optical signal.

11. The apparatus of claim 6, further comprising means for designating an object in the field of view, the designation comprising the optical signal.

12. An imaging system, comprising:
- a receiver subsystem capable of receiving a reflection of a polarimetric, dichroic optical signal and a second signal of a third wavelength, separating the optical signal from the second signal by wavelength, separating the dichroic constituents of the optical signal by wavelength, and separating the polarized elements of the dichroic constituents;
- a common aperture through which the optical signal is transmitted and the reflection and the second signal are received; and
- a processing subsystem capable of generating at least one image from the separated polarized elements and the separated second signal.

13. The imaging system of claim 12, further comprising a transmitter subsystem capable of generating and transmitting the polarimetric, dichroic optical signal.

14. The imaging system of claim 13, wherein the transmitter subsystem includes:
- a source capable of generating a polarimetric, dichroic optical signal; and
- a plurality of optics for conditioning the optical signal for transmission.

15. The imaging system of claim 12, wherein the receiver subsystem includes:
- means for separating a received reflection of the optical signal and a second signal having a third wavelength, for separating the dichroic constituents of the optical signal by wavelength, and for separating the polarized elements of the dichroic constituents;
- an optical detector for detecting the separated polarized elements of the separated dichroic elements;
- a second detector for detector the separated second signal; and
- capture electronics for capturing the detected polarize elements and the detected second signal.

16. The imaging system of claim 12, wherein the processing subsystem includes means for generating at least one image from the detected polarized elements and the detected second signal.

17. The imaging system of claim 12, wherein the common aperture comprises an opening in the housing of the platform.

18. The imaging system of claim 17, wherein the common aperture includes an optical element.

19. An apparatus, comprising:
- means for receiving a reflection of a polarimetric, dichroic optical signal and a second signal of a third wavelength, separating the optical signal from the second signal by wavelength, separating the dichroic constituents of the optical signal by wavelength, and separating the polarized elements of the dichroic constituents; and
- a common aperture through which the optical signal is transmitted and the reflection and the second signal are received.

20. The apparatus of claim 19, further comprising a processing subsystem capable of generating at least one image from the separated polarized elements and the separated second signal.

21. The apparatus of claim 19, wherein the receiving means comprises a receiver subsystem.

22. The apparatus of claim 19, further comprising a transmitter subsystem capable of generating and transmitting the polarimetric, dichroic optical signal.

23. The apparatus of claim 19, wherein the transmitter subsystem includes:
- a source capable of generating a polarimetric, dichroic optical signal; and
- a plurality of optics for conditioning the optical signal for transmission.

24. The apparatus of claim 23, wherein the optics include:
- a collimator for collimating the polarimetric, dichroic optical signal;
- a splitter capable of splitting the collimated optical signal into a plurality of beamlets; and
- a scanner for scanning the beamlets into a field of view.

25. The apparatus of claim 19, wherein the receiver subsystem includes:
- means for separating a received reflection of the optical signal and a second signal having a third wavelength, for separating the dichroic constituents of the optical signal by wavelength, and for separating the polarized elements of the dichroic constituents;
- an optical detector for detecting the separated polarized elements of the separated dichroic elements;
- a second detector for detector the separated second signal; and
- capture electronics for capturing the detected polarize elements and the detected second signal.

26. The apparatus of claim 19, wherein the common aperture comprises an opening in the housing of the platform.

27. The apparatus of claim 26, wherein the common aperture includes an optical element.

* * * * *